United States Patent
Frolov et al.

(10) Patent No.: US 7,027,212 B2
(45) Date of Patent: Apr. 11, 2006

(54) WAVEGUIDE OPTICAL AMPLIFIER

(75) Inventors: Sergey Frolov, Berkeley Heights, NJ (US); Joseph Shmulovich, New Providence, NJ (US)

(73) Assignee: Inplane Photonics, Inc., South Plainfield, NJ (US)

( * ) Notice: Subject to any disclaimer, the term of this patent is extended or adjusted under 35 U.S.C. 154(b) by 0 days.

(21) Appl. No.: 10/818,672

(22) Filed: Apr. 6, 2004

(65) Prior Publication Data

US 2004/0257639 A1 Dec. 23, 2004

Related U.S. Application Data

(63) Continuation of application No. 10/066,283, filed on Jan. 31, 2002, now abandoned.

(51) Int. Cl.
*H01S 3/00* (2006.01)
(52) U.S. Cl. .................... 359/333; 359/341.3
(58) Field of Classification Search ........... 359/333, 359/341.3
See application file for complete search history.

(56) References Cited

U.S. PATENT DOCUMENTS

| | | | |
|---|---|---|---|
| 5,253,104 A | 10/1993 | Delavaux | 359/341 |
| 5,430,572 A | 7/1995 | DiGiovanni et al. | 359/341 |
| 5,719,976 A | 2/1998 | Henry et al. | 385/50 |
| 5,768,452 A | 6/1998 | Atkins et al. | 385/27 |
| 5,887,097 A | 3/1999 | Henry et al. | 385/39 |
| 5,930,029 A | 7/1999 | Mehuys | 359/341 |
| 5,985,685 A | 11/1999 | Lealman et al. | 438/31 |
| 5,995,275 A * | 11/1999 | Sugaya | 359/341.3 |
| 6,043,929 A | 3/2000 | Delavaux | 359/337 |
| 6,052,397 A | 4/2000 | Jeon et al. | 372/46 |
| 6,157,765 A | 12/2000 | Bruce et al. | 385/129 |
| 6,293,688 B1 | 9/2001 | Deacon | 362/556 |
| 6,493,476 B1 | 12/2002 | Bendett | 385/14 |
| 6,549,688 B1 | 4/2003 | Bazylenko | 385/14 |
| 6,721,087 B1 * | 4/2004 | Alduino et al. | 359/333 |

FOREIGN PATENT DOCUMENTS

WO  WO 03/076990 A1 * 9/2003

\* cited by examiner

*Primary Examiner*—Mark Hellner
(74) *Attorney, Agent, or Firm*—Mayer & Williams PC; Stuart H. Mayer, Esq.

(57) ABSTRACT

A planar waveguide optical amplifier includes a substrate and an active waveguide formed on the substrate for imparting gain to an optical signal propagating therethrough. The active waveguide has an input port for receiving an optical signal to be amplified and an output port on which an amplified optical signal is directed. A plurality of coupling elements are formed on the substrate and are adapted to couple pump power to the active waveguide. The plurality of coupling elements are located at predetermined positions along the active waveguide.

50 Claims, 4 Drawing Sheets

WAVEGUIDE OPTICAL AMPLIFIER

RELATED APPLICATION

This application is a continuation application of pending U.S. application Ser. No. 10/066,283, filed Jan. 31, 2002, now abandoned, titled "Waveguide optical amplifier", which is incorporated by reference herein.

FIELD OF THE INVENTION

This invention relates to active optical devices, such as amplifiers, that operate by stimulated emission, and in particular, to planar waveguide optical amplifiers in which pump energy is injected at multiple locations along a doped waveguide.

BACKGROUND OF THE INVENTION

Optical amplifiers are essential components employed in optical communication networks for boosting optical signals weakened by propagation losses, splitting and filtering. A number of types of optical amplifiers have been developed. One class of optical amplifiers is rare-earth doped optical amplifiers, which use rare-earth ions as the active element. The ions are doped in the fiber core and pumped optically to provide gain. The silica core serves as the host medium for the ions. While many different rare-earth ions such as neodymium, praseodymium, ytterbium etc. can be used to provide gain in different portions of the spectrum, erbium-doped optical amplifiers have proven to be particularly attractive because they are operable in the spectral region where optical loss in the silica core is minimal. Also, the erbium-doped optical amplifier is particularly useful because of its ability to amplify multiple wavelength channels without crosstalk penalty, even when operating deep in gain compression.

There are two primary types of rare-earth doped optical amplifiers, fiber optical amplifiers and planar waveguide optical amplifiers. Fiber amplifiers are optical glass fibers having cores doped with the optically active element. Waveguide amplifiers are planar waveguides fabricated on suitable substrates such as silicon. The planar waveguide amplifiers include cores doped with optically active elements.

Fiber amplifiers are often favored over waveguide amplifiers in most applications because waveguide amplifiers are typically much shorter, requiring a correspondingly higher level of doping to achieve the necessary gain of fiber amplifiers. Higher levels of doping adversely affect the efficiency of the amplifier. However, waveguide amplifiers are easier to manufacture than fiber amplifiers because large numbers of them can be fabricated on a single wafer and integrated on the same chip with other components making the whole unit less expensive. Therefore, in applications requiring relatively small components, device integration and ease of packaging, it is advantageous to use waveguide amplifiers.

One problem with waveguide amplifiers in comparison to fiber waveguides is their high scattering losses, which may be three orders of magnitude greater than in a fiber and which limits the overall gain that can be achieved.

SUMMARY OF THE INVENTION

In accordance with the present invention, a planar waveguide optical amplifier is provided. The amplifier includes a substrate and an active waveguide formed on the substrate for imparting gain to an optical signal propagating therethrough. The active waveguide has an input port for receiving an optical signal to be amplified and an output port on which an amplified optical signal is directed. A plurality of coupling elements are formed on the substrate and are adapted to couple pump power to the active waveguide. The plurality of coupling elements are located at predetermined positions along the active waveguide.

In accordance with one aspect of the invention, the waveguide is a multi-component glass waveguide such as a doped silica glass waveguide, for example.

In accordance with another aspect of the invention, the predetermined positions along the doped waveguide at which the coupling elements are located are selected so that the pump power between adjacent ones of the coupling elements decreases by at least about 3 dB.

In accordance with yet another aspect of the invention, at least one pump source is formed on the substrate and optically coupled to at least one of the coupling elements for supplying pump power to the active waveguide.

In accordance with another aspect of the invention, the plurality of coupling elements include a first coupling element arranged to couple pump energy in a direction co-propagating with a signal to be amplified and a second coupling element arranged to couple pump energy in a direction counter-propagating with the signal.

In accordance with another aspect of the invention, the plurality of coupling elements include first and second coupling elements which are adapted to couple pump energy at a common pump wavelength. Alternatively, the first and second coupling elements are adapted to couple pump energy at different pump wavelengths.

In accordance with another aspect of the invention, a method is presented for providing pump power to a planar waveguide optical amplifier. The method begins by providing an active waveguide formed on a substrate for imparting gain to an optical signal propagating therethrough. The active waveguide has an input port for receiving an optical signal to be amplified and an output port on which an amplified optical signal is directed. The method continues by coupling pump power to the active waveguide at a plurality of predetermined positions along the active waveguide.

In accordance with another aspect of the invention, the pump power is coupled to the active waveguide at a plurality of positions where the pump power between adjacent ones of the coupling elements decreases by about 3 dB.

DETAILED DESCRIPTION

As a preliminary matter, it is worthy to note that any reference herein to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

One important difference between planar waveguides and optical fiber is that scattering losses are much higher in planar waveguides. This limits the overall gain that can be achieved with a waveguide optical amplifier because the overall gain increases with the total quantity of the active element present in the waveguide. Since the quantity of the active element that can be incorporated into the waveguide increases with its length, anything such as scattering losses that limits the length of the waveguide will also limit its overall gain. It should be noted that it is the scattering of the pump energy and not the scattering of the signal that limits the overall gain. This is because a sufficient quantity of the active element can be incorporated into each unit length of the waveguide so that the gain imparted to the signal is greater than the scattering loss. However, the pump energy will be depleted after traversing a certain length of the waveguide because of scattering losses. In contrast, in a fiber-based optical amplifier the length of the active portion of the fiber does not limit its overall gain because the reduction in pump energy arising from scattering is negligible over the entire length of the fiber. Accordingly, in a fiber-based optical amplifier pump depletion is only a limiting factor on the overall gain at high signal levels, since at these levels the pump energy is significantly reduced as it is imparted to the signal.

In accordance with the present invention, the length, and hence the overall achievable gain, of a waveguide optical amplifier can be increased by injecting pump energy at multiple points along the waveguide. In general, additional pump energy is injected into the waveguide at those points along its length where the previously injected pump energy falls to an undesirably low level because of both scattering of the pump energy and the operational conditions of the amplifier.

Figure 1:
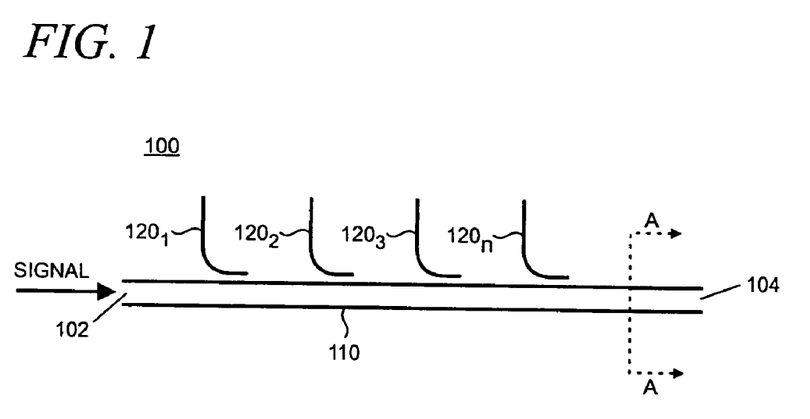
FIG. 1 shows one embodiment of a waveguide optical amplifier constructed in accordance with the present invention.

FIG. 1 shows one embodiment of a waveguide optical amplifier 100 constructed in accordance with the present invention. Waveguide optical amplifier 100 includes a planar doped waveguide 110 in which an optical signal to be amplified propagates. Planar waveguide 110 may be a single or multimode waveguide and is doped with an active element such as a rare-earth element, e.g., erbium. The waveguide 110 includes an input port 102 for receiving the optical signal to be amplified and an output port 104 for conveying the amplified optical signal to an external element. The waveguide optical amplifier 100 also includes two or more coupling elements $120_1$, $120_2$, $120_3$ . . . $120_n$, for coupling optical pump energy to waveguide 110. Coupling elements 120 are located at predefined positions along waveguide 110 and are spaced apart from one another at intervals that may or may not be equal to one another and which is in part determined by the gain profile that is to be achieved along the waveguide. For example, the coupling elements can be separated from one another by a distance corresponding to some specified decrease, e.g., 3 dB, in optical energy at the pump wavelength. Coupling elements 120 may be any components that can convey the optical pump energy from a pump source to the waveguide 110 and may include, for example, directional couplers, or MMIs. Coupling elements 120 are configured to strongly couple optical energy at the pump wavelength and weakly couple optical energy at the signal wavelength.

Figure 2:
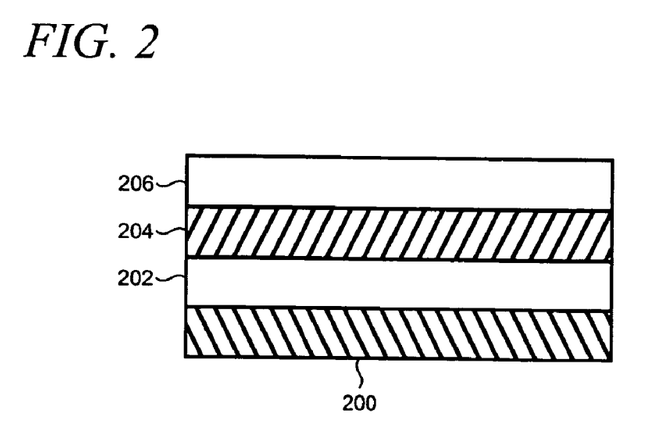
FIG. 2 shows a cross-section through the planar waveguide in FIG. 1 taken along line A—A.

FIG. 2 shows a cross-section through planar waveguide 110 taken along line A—A in FIG. 1. As shown, planar waveguide 110 includes substrate 200, lower cladding layer 202, core layer 204, and upper cladding layer 206. Core layer 204 has an index of refraction greater than the index of refraction of lower and upper cladding layers 202 and 206 so that the optical energy is substantially confined to the core layer 204. Core layer is doped with an active element such as a rare-earth element (e.g., erbium).

Waveguide 110 and coupling elements $120_1$, $120_2$, $120_3$ . . . $120_n$, may be fabricated in a variety of different ways from a variety of different materials. For example, silicon technology is often employed to form multi-component glass waveguides or waveguide circuits. Doped-silica waveguides are usually preferred because they have a number of attractive properties including low cost, low loss, stability, and compatibility for coupling to laser diodes, other waveguides, high NA fiber and standard fiber. Such a waveguide is fabricated on a carrier substrate, which typically comprises silicon or silica. The substrate serves as a mechanical support for the otherwise fragile waveguide and it can, if desired, also play the role of the bottom portion of the cladding. In addition, it can serve as a fixture to which input and output fibers are attached so as to optically couple cores of an input/output fiber to the cores of the waveguide.

The fabrication process begins by depositing a base or lower cladding layer of low index silica on the carrier substrate (assuming the substrate itself is not used as the cladding layer). A layer of doped glass with a high refractive index, i.e., the core layer, is then deposited on top of the lower cladding layer. The core layer is subsequently patterned or sculpted into structures required by the optical circuits using photo-lithographic techniques similar to those used in integrated circuit fabrication. Lastly, a top cladding layer is deposited to cover the patterned waveguide core. The difference in refractive index between the core and cladding layers of the waveguide is mostly determined by the material system and the fabrication process. In practice, different waveguide structures and systems are used for different types of functions and trade-offs are made in the core dimensions and the refractive index difference to optimize different aspects of optical performance.

Those of ordinary skill in the art will recognize that the present invention is not limited to silica-based waveguides. More generally, the invention encompasses waveguides based on other optically guiding structures such as other multi-component glasses or polymeric materials. For example, other glass compositions that may be used include oxides of germanium, phosphorus, and boron as well as combinations thereof. In addition, the glass compositions that are employed may include one or more modifiers (e.g., alkali and alkaline elements) as well as a variety of different active elements. Moreover, the present invention also encompasses planar waveguides that have a different structure and geometry from that shown in FIG. 2. For example, core layer 204 may comprise a passive layer in addition to the active layer seen in FIG. 2.

As is well-known in the art, optical amplification within a doped amplifier occurs at predetermined signal wavelengths (for example, $\lambda s =1550$ nm) in the presence of pump signals at certain wavelengths (for example, if erbium is employed as the active element, $\lambda p =980$ nm or 1480 nm). Accordingly, the pump energy received by the coupling elements $120_1, 120_2, 120_3, \ldots 120_n$, may be all at the same wavelength (e.g., $\lambda_{p1}=\lambda_{p2}=\lambda_{p3} \ldots =\lambda_{pn}=980$ nm). In general, however, different coupling elements may receive different pump energies. In fact, since each pump wavelength offers different benefits, each may be used to form an optical amplifier which exhibits attributes of the different pump wavelengths. For example, referring again to an amplifier in which the active element is erbium, pump wavelengths of both 980 nm and 1480 nm may be used. Using a 980 nm pump signal is known to provide relative high gain with relative low noise—ideal conditions for a pre-amplifier application. A pump wavelength at 1480 nm is known to result in relatively high conversion efficiency—ideal for power boosting applications. Thus, the combination of pump wavelengths can provide an optical amplifier with a relatively low amplified spontaneous emission (ASE) in combination with a high conversion efficiency.

Because in the present invention pump energy is injected at multiple points along the doped waveguide the amplifier length, and hence its gain, can be increased without being limited by the scattering of the pump energy. This capability is particularly advantageous if the amplifier is designed to operate in the L-band (herein defined as the spectral range from about 1560–1615 nm), which have features that distinguish it from an amplifier designed to work in the heavily used C-band, which is typically defined as the spectral range from approximately 1530 nm to 1560 nm. Among the notable differences is a relatively flatter gain spectra at low inversions (i.e., 0.4 versus 0.6–0.7), which necessitates lengths of erbium doped fiber on the order of about 75 m up to about 300 m (for current typical Er concentrations), in contrast to less than about 50 m for conventional C-band devices. This is due at least in part to the relatively low emission cross section of erbium for wavelengths greater than approximately 1560 nm.

Figure 3:
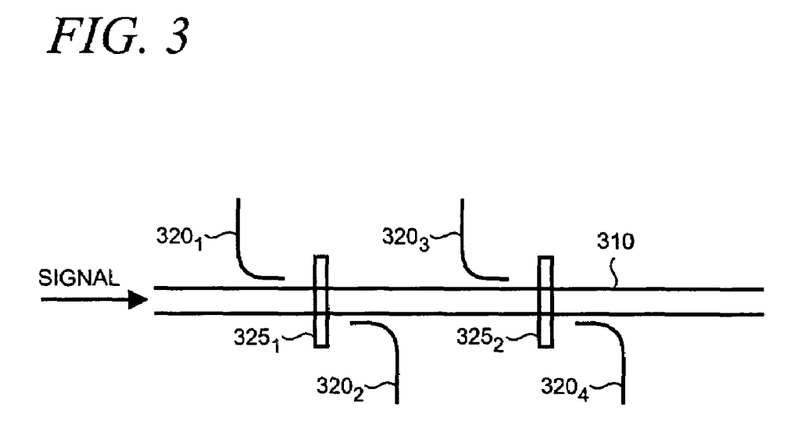
FIG. 3 shows an alternative embodiment of the waveguide optical amplifier constructed in accordance with the present invention.

While FIG. 1 shows an arrangement in which the pump energy is co-propagating with the signal, the present invention also encompasses waveguide optical amplifiers in which one or more of the coupling elements are arranged so that pump energy counter-propagates with the signal. For example, FIG. 3 shows an embodiment of the invention in which two coupling elements $320_1$ and $320_3$ direct pump energy that is co-propagating with the signal and two coupling elements $320_2$ and $320_4$ direct pump energy that is counter-propagating with the signal. In some particular embodiments of the invention co-propagating coupling elements $320_1$ and $320_3$ direct pump energy at a different wavelength from counter-propagating coupling elements $320_2$ and $320_4$. For instance, in the case of an erbium amplifier, coupling elements $320_1$ and $320_3$ may direct pump energy at a wavelength of 980 nm while coupling elements $320_2$ and $320_4$ may direct pump energy at a wavelength of 1480 nm. One advantage of this arrangement is that crosstalk between the co-propagating and counter-propagating pump energies is minimal because their respective wavelengths are so widely separated.

As further indicated in FIG. 3, in some embodiments of the invention filters $325_1$ and $325_2$ may be optionally positioned in the waveguide 310 between co-propagating and counter-propagating coupling elements. The filters $325_1$ and $325_2$ may be advantageously employed when the co-propagating and counter-propagating pump energy have the same wavelengths. In this case the filters $325_1$ and $325_2$ are configured to transmit signal wavelengths while rejecting pump energy wavelengths, thereby preventing crosstalk between the oppositely directed pump energies. In some cases the filters $325_1$ and $325_2$ may reflect the rejected pump energy so that at least some of it may used to further pump the rare earth element. The filters $325_1$ and $325_2$ may be, for example, Multi-Mode Interference (MMI) filters, directional couplers, or any other appropriate devices.

Figure 4:
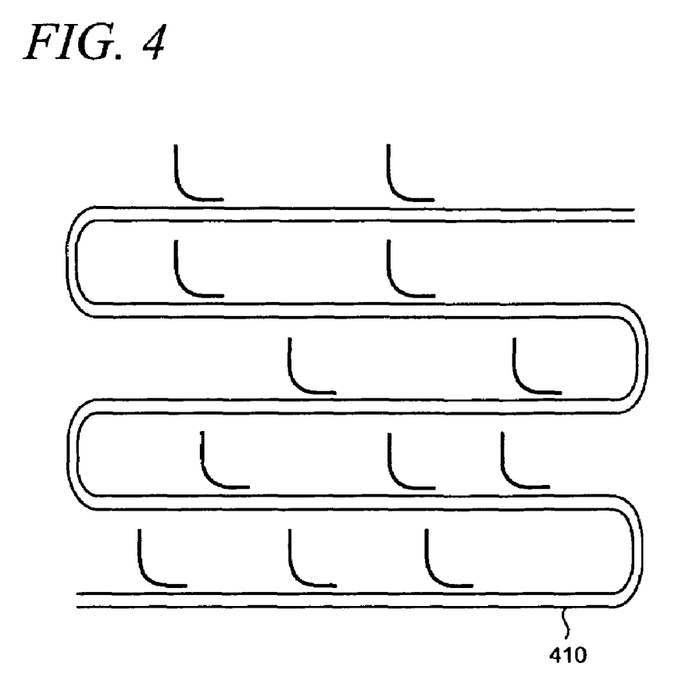
FIG. 4 shows another embodiment of the invention in which the active waveguide forms a circuitous or serpentine path on the substrate.

FIG. 4 shows another embodiment of the invention in which the waveguide 410 forms a circuitous or serpentine path on the substrate. One advantage of this embodiment of the invention is that a long waveguide can be formed with a relatively small footprint. Of course, circuitous patterns other than that shown in FIG. 4 can be used. For example, in some cases it may be desirable to provide a coiled waveguide pattern.

In some embodiments of the invention the pump source or sources may be waveguide lasers that are directly integrated on the same substrate as the waveguide optical amplifier. This is particularly advantageous because all the active and passive elements of the waveguide optical amplifier can be conveniently located on a single chip. The pump source or sources may be single mode or multimode sources of optical energy.

Figure 5:
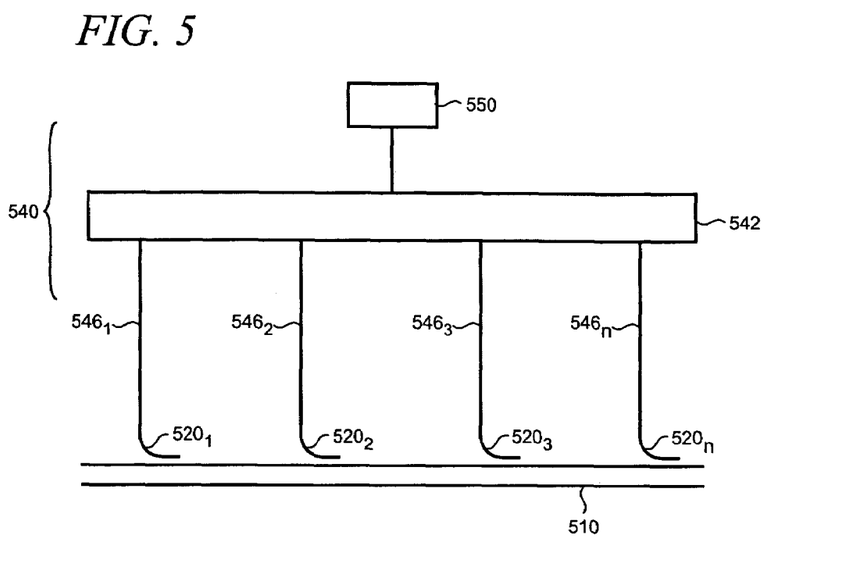
FIG. 5 shows another embodiment of the invention that employs a pump distribution network that receives pump energy from a single pump source.

The coupling elements seen in FIGS. 1–4 may each receive pump energy from a different pump source or from a common pump source. Moreover, if a common pump source is employed, a distribution network may be provided to distribute the pump energy to the different coupling elements. For example, the embodiment of the invention shown in FIG. 5 includes a pump distribution network 540 that receives pump energy from pump source 550. Pump distribution network 540 includes a splitting element 542 and pump transfer waveguides $546_1, 546_2, 546_3, \ldots 546_n$. The pump transfer waveguides $546_1, 546_2, 546_3, \ldots 546_n$ are respectively coupled to coupling elements $520_1, 520_2, 520_3, \ldots 520_n$. Pump source 550 and pump distribution network 540 may be advantageously integrated on the same substrate with the remaining elements of the amplifier, i.e., coupling elements $520_1, 520_2, 520_3, \ldots 520_n$ and waveguide 510. In some embodiments of the invention an active waveguide may be situated between the pump source 550 and the pump distribution network.

Figure 6:
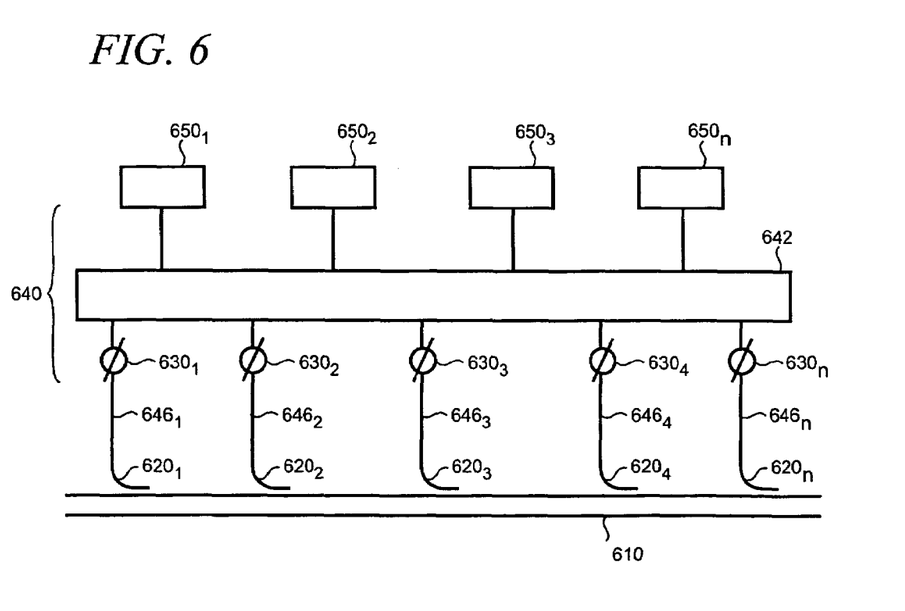
FIG. 6 shows another embodiment of the invention that employs a pump distribution network that receives pump energy from two or pump sources and distributes it among a plurality of pump transfer waveguides.

While pump distribution network 540 may be as simple as a 1×N splitter with N waveguides for conveying the pump energy from the splitter to the coupling elements, more complex arrangements providing additional functionality are also contemplated. For example, FIG. 6 shows a pump distribution network 640 that receives pump energy from two or pump sources $650_1, 650_2, 650_3, \ldots 650_m$ and distributes it among pump transfer waveguides $646_1, 646_2, 646_3, \ldots 646_n$. As previously mentioned, pump sources $650_1, 650_2, 650_3, \ldots 650_n$ may be single or multimode sources. If the pump sources are multimode, in one embodiment of the invention one or more of the transfer waveguides $646_1, 646_2, 646_3, \ldots 646_n$ may include resonant cavities to select a single mode that is transferred to the coupling elements $620_1, 620_2, 620_3, \ldots 620_n$. Moreover, as seen in FIG. 6, adjustable pump power elements $630_1, 630_2, 630_3, \ldots 630_n$ may be respectively situated in the pump transfer waveguides $646_1, 646_2, 646_3, \ldots 646_n$ to provide different amounts of pump energy to the coupling elements $620_1, 620_2, 620_3, \ldots 620_n$, thereby allowing the gain profile along the doped waveguide 610 to be adjusted in a controlled manner. A number of different components may serve as adjustable pump power elements $630_1$, $630_2$, $630_3$, ... $630_n$, including tunable directional couplers, tunable Mach-Zehnder interferometers, and variable attenuators.

In some embodiments of the invention one or more isolators or bandpass optical filters may be inserted in the signal path between the coupling elements to reduce any amplified spontaneous emission and to prevent reflected pump signals from interfering with one another. Further, various parameters of the doped waveguide amplifiers may be controlled so as to provide desired amplifier characteristics. For example, these parameters may include the waveguide dimensions, the dopant concentration within the waveguide (and, further, a gradient in dopant distribution within the waveguide), the length of the doped waveguide sections, the pump wavelengths and pump power. Various combinations of these and other parameters may be controlled to provide the desired results (e.g., maximum gain, power boosting, etc.).

EXAMPLE

To further facilitate an understanding of the invention, but not as a limitation thereon, an example of an erbium doped waveguide amplifier employing three pump lasers will now be presented. Each pump laser delivers an optical power $P_{in}$ of 100 mW at 980 nm. In cross-section the waveguide has a height of 2 microns and a width of 4 microns. The waveguide is doped with erbium ions providing optical absorption in the absence of pump energy of 1 dB/cm at 980nm and 2 dB/cm at 1530 nm. When the pump energy is applied the erbium absorption decreases so that the pump loss is determined primarily by optical scattering from waveguide imperfections, which in this example is characterized by an optical scattering $\alpha^*$ of 0.2 dB/cm.

Figure 7:
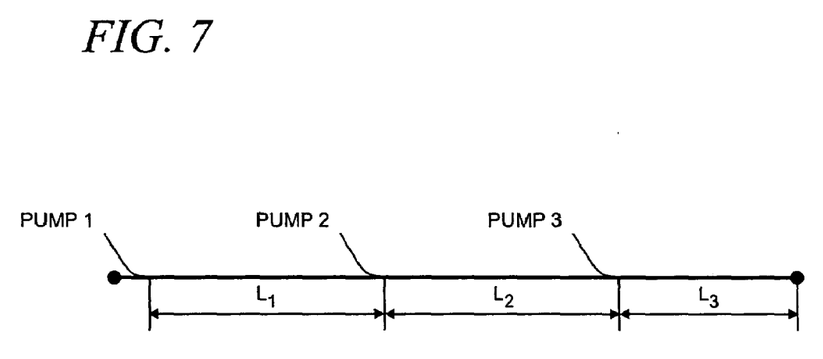
FIG. 7 shows an embodiment of the invention that employs three pump lasers and three optical coupling elements.

As shown in FIG. 7, the second coupling element is spaced a distance L1 from the first coupling element and the third coupling element is spaced a distance L2 from the second coupling element and a distance L3 from the signal output port of the waveguide. The total length of the erbium doped waveguide is $L=L_1+L_2+L_3=1$ m. The position of the second coupling element for optimally coupling light from the $2^{nd}$ pump laser can be determined from the propagation characteristics of the light from the $1^{st}$ pump laser. In the limit of a high population inversion, the propagation loss is governed by scattering. As a result, the output pump power $P_{out}$ after propagating along length $L_1$ is given by (in dBm):

$$P_{out}=P_{in}-\alpha^* L_1 \quad (1)$$

To provide an adequate inversion level at the end of the waveguide $P_{out}$ should be greater or equal to $kP_{sat}$, where k in this example is about 10 for a high NA waveguide, which is characterized by a highly nonuniform population inversion across the cross-section of its core (in contrast to an EDFA, k is about 2 for power amplifiers and 4 for low-noise preamplifiers). $P_{sat}$ is the intrinsic saturation power and is given by:

$$P_{sat} = \frac{h\nu A}{\sigma_a \tau} \quad (2)$$

where h is Plank's constant, $\nu$ is the pump optical frequency, A is the pump modal cross-section area (10 μm²), $\sigma_a$ is the absorption optical cross-section ($10^{-21}$ cm²), and $\tau$ is the excited state lifetime (10 msec). In this case the optimum value of $L_1$ is given by $$L_1 = \frac{P_{in}-kP_{sat}}{\alpha^*} \quad (3)$$

Using the above parameters, $L_1$ is calculated to be about 35 cm. Considering that the other two pump lasers and coupling elements are identical to the first pump laser and coupling element, to a first approximation $L_1=L_2=L_3$. Additional considerations arise, however, because the higher intensity of the signal at the remote end of the waveguide relative to the front end of the waveguide lowers the inversion level. Therefore, a larger value of k (11 in this case) has to be used to determine $L_3$. This calculation gives a value of $L_3$ equal to 30 cm.

The amplifier in this particular example is suitable for L-band (e.g., wavelengths of about 1565–1620 nm) amplification, in which case 980 nm pump lasers are replaced by either 1480 nm or 1550 nm lasers. However, although the pump lasers are different, the coupling elements (or the pump distribution network, if provided) remain essentially unchanged.

The invention claimed is:

1. A planar waveguide optical amplifier, comprising:
a substrate;
an active waveguide formed on the substrate for imparting gain to an optical signal propagating therethrough, said active waveguide having an input port for receiving an optical signal to he amplified and an output port on which an amplified optical signal is directed;
a plurality of coupling elements formed on the substrate and adapted to couple pump power to the active waveguide, said plurality of coupling elements being located at predetermined positions along the active waveguide
a pump distribution network formed on the substrate for distributing the pump energy from at least one pump source to each of the coupling elements.

2. The optical amplifier of claim 1 wherein said active waveguide is a multi-component glass waveguide.

3. The optical amplifier of claim 2 wherein said multi-component glass waveguide is a rare-earth doped glass waveguide.

4. The optical amplifier of claim 3 wherein said rare-earth doped glass waveguide is a rare-earth doped silica glass waveguide.

5. The optical amplifier of claim 2 wherein said multi-component glass waveguide is a multi-component silica glass waveguide.

6. The optical amplifier of claim 1 wherein said predetermined positions along the doped waveguide are selected so that the pump power between adjacent ones of the coupling elements decreases by at least about 3 dB.

7. The optical amplifier of claim 1 further comprising at least one pump source formed on the substrate and optically coupled to at least one of the coupling elements for supplying pump power to the active waveguide.

8. The optical amplifier of claim 1 wherein the plurality of coupling elements include a first coupling element arranged to couple pump energy in a direction co-propagating with a signal to be amplified and a second coupling element arranged to couple pump energy in a direction counter-propagating with the signal.

9. The optical amplifier of claim 1 wherein the plurality of coupling elements include first and second coupling elements adapted to couple pump energy at a common pump wavelength.

10. The optical amplifier of claim 1 wherein the plurality of coupling elements include first and second coupling elements adapted to couple pump energy at different pump wavelengths.

11. The optical amplifier of claim 8 wherein the first and second coupling elements are adapted to couple pump energy at different pump wavelengths.

12. The optical amplifier of claim 10 wherein the active waveguide is an erbium doped waveguide and the different pump wavelengths are about 980 and 1480 nm.

13. The optical amplifier of claim 11 wherein the active waveguide is an erbium doped waveguide and the different pump wavelengths are about 980 and 1480 nm.

14. The optical amplifier of claim 1 further comprising at least one filter element disposed in the active waveguide.

15. The optical amplifier of claim 14 wherein the filter element is a multi-mode interference filter.

16. The optical amplifier of claim 14 wherein said at least one filter element includes first and second filter elements, said first filter element being configured to reject co-propagating pump energy and the second filter element being configured to reject counter-propagating pump energy.

17. A planar waveguide optical amplifier, comprising:
a substrate;
an active waveguide formed on the substrate for imparting gain to an optical signal propagating therethrough, said active waveguide having an input port for receiving an optical signal to be amplified and an output port on which an amplified optical signal is directed; and
a plurality of coupling elements formed on the substrate and adapted to couple pump power to the active waveguide, said plurality of coupling elements being located at predetermined positions along the active waveguide;
at least one pump source formed on the substrate and optically coupled to at least one of the coupling elements for supplying pump power to the active waveguide;
a pump distribution network formed on the substrate for distributing the pump energy from the at least one pump source to each of the coupling elements.

18. The optical amplifier of claim 17 wherein said active waveguide is a multi-component glass waveguide.

19. The optical amplifier of claim 18 wherein said multi-component glass waveguide is a rare-earth doped glass waveguide.

20. The optical amplifier of claim 19 wherein said rare-earth doped glass waveguide is a rare-earth doped silica glass waveguide.

21. The optical amplifier of claim 18 wherein said multi-component glass waveguide is a multi-component silica glass waveguide.

22. The optical amplifier of claim 17 wherein said predetermined positions along the doped waveguide are selected so that the pump power between adjacent ones of the coupling elements decreases by at least about 3 dB.

23. The optical amplifier of claim 17 wherein the plurality of coupling elements include a first coupling element arranged to couple pump energy in a direction co-propagating with a signal to be amplified and a second coupling element arranged to couple pump energy in a direction counter-propagating with the signal.

24. The optical amplifier of claim 17 wherein the plurality of coupling elements include first and second coupling elements adapted to couple pump energy at a common pump wavelength.

25. The optical amplifier of claim 17 wherein the plurality of coupling elements include first and second coupling elements adapted to couple pump energy at different pump wavelengths.

26. The optical amplifier of claim 23 wherein the first and second coupling elements are adapted to couple pump energy at different pump wavelengths.

27. The optical amplifier of claim 25 wherein the active waveguide is an erbium doped waveguide and the different pump wavelengths are about 980 and 1480 nm.

28. The optical amplifier of claim 26 wherein the active waveguide is an erbium doped waveguide and the different pump wavelengths are about 980 and 1480 nm.

29. The optical amplifier of claim 17 wherein said pump source is a multimode pump source.

30. The optical amplifier of claim 17 further comprising at least one filter element disposed in the active waveguide.

31. The optical amplifier of claim 30 wherein the filter element is a multi-mode interference filter.

32. The optical amplifier of claim 30 wherein said at least one filter element includes first and second filter elements, said first filter element being configured to reject co-propagating pump energy and the second filter element being configured to reject counter-propagating pump energy.

33. A planar waveguide optical amplifier, comprising:
a substrate;
an active waveguide formed on the substrate for imparting gain to an optical signal propagating therethrough, said active waveguide having an input port for receiving an optical signal to be amplified and an output port on which an amplified optical signal is directed;
a plurality of coupling elements formed on the substrate and adapted to couple pump power to the active waveguide, said plurality of coupling elements being located at predetermined positions along the active waveguide; and
at least one filter element disposed in the active waveguide.

34. The optical amplifier of claim 33 wherein said active waveguide is a multi-component glass waveguide.

35. The optical amplifier of claim 34 wherein said multi-component glass waveguide is a rare-earth doped glass waveguide.

36. The optical amplifier of claim 35 wherein said rare-earth doped glass waveguide is a rare-earth doped silica glass waveguide.

37. The optical amplifier of claim 34 wherein said multi-component glass waveguide is a multi-component silica glass waveguide.

38. The optical amplifier of claim 33 wherein said predetermined positions along the doped waveguide are selected so that the pump power between adjacent ones of the coupling elements decreases by at least about 3 dB.

39. The optical amplifier of claim 33 further comprising at least one pump source formed on the substrate and optically coupled to at least one of the coupling elements for supplying pump power to the active waveguide.

40. The optical amplifier of claim 33 wherein the plurality of coupling elements include a first coupling element arranged to couple pump energy in a direction co-propagating with a signal to be amplified and a second coupling element arranged to couple pump energy in a direction counter-propagating with the signal.

41. The optical amplifier of claim 33 wherein the plurality of coupling elements include first and second coupling elements adapted to couple pump energy at a common pump wavelength.

42. The optical amplifier of claim 33 wherein the plurality of coupling elements include first and second coupling elements adapted to couple pump energy at different pump wavelengths.

43. The optical amplifier of claim 40 wherein the first and second coupling elements are adapted to couple pump energy at different pump wavelengths.

44. The optical amplifier of claim 42 wherein the active waveguide is an erbium doped waveguide and the different pump wavelengths are about 980 and 1480 nm.

45. The optical amplifier of claim 43 wherein the active waveguide is an erbium doped waveguide and the different pump wavelengths are about 980 and 1480 nm.

46. The optical amplifier of claim 33 further comprising a pump distribution network formed on the substrate for distributing the pump energy from at least one pump source to each of the coupling elements.

47. The optical amplifier of claim 39 further comprising a pump distribution network formed on the substrate for distributing the pump-energy from the at least one pump source to each of the coupling elements.

48. The optical amplifier of claim 33 wherein the filter element is a multi-mode interference filter.

49. The optical amplifier of claim 33 wherein said at least one filter element includes first and second filter elements, said first filter element being configured to reject co-propagating pump energy and the second filter element being configured to reject counter-propagating pump energy.

50. A method for reducing background losses arising from scattering and/or unsaturable absorption in a gain medium of a planar waveguide optical amplifier, comprising:
  providing an active waveguide having a gain medium therein for imparting gain to an optical signal propagating therethrough, said active waveguide having an input port for receiving an optical signal to be amplified and an output port on which an amplified optical signal is directed; and
  coupling pump power to the active waveguide at a plurality of predetermined positions along the active waveguide, wherein the predetermined positions are determined in accordance with:

$$L = \frac{P_{in} - kP_{sat}}{\alpha^*}$$

where L is a given one of the predetermined positions along the waveguide at which pump power is coupled, $P_{in}$ is the power delivered to the waveguide at the given predetermined position from a previous one of the predetermined positions, $P_{sat}$ is the intrinsic saturation power of the active waveguide, k is the ratio of minimum pump power to $P_{sat}$, and $\alpha$ is the optical scattering parameter of the active waveguide.

* * * * *